J. R. CHAMPLIN.
Ice-Cream Freezer.
No. 44,851.  Patented Nov. 1, 1864.
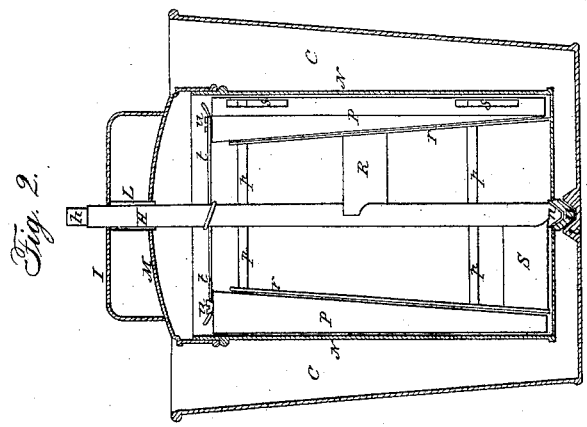
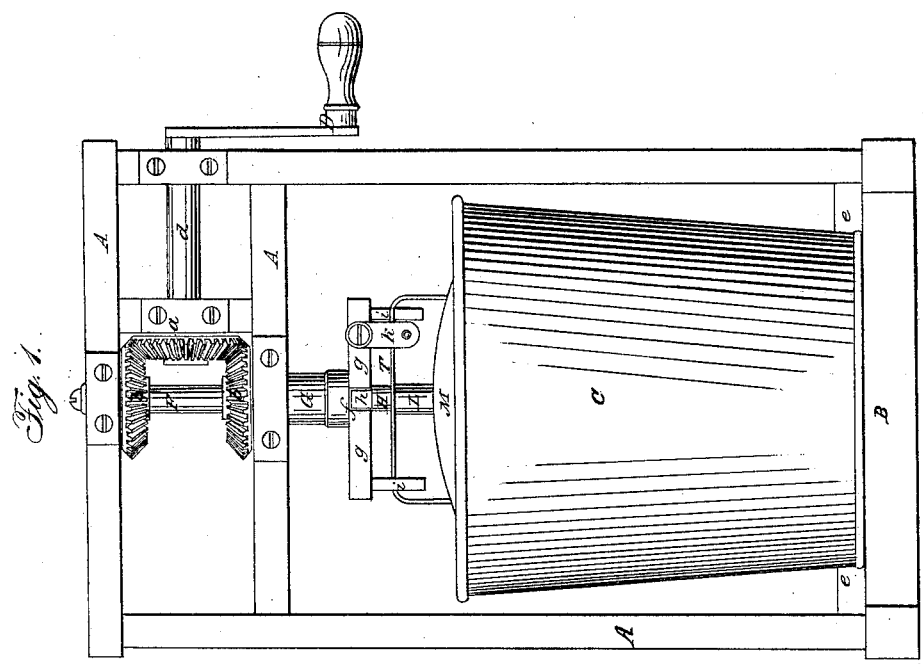
Witnesses:
Inventor:

UNITED STATES PATENT OFFICE.

JOHN R. CHAMPLIN, OF LACONIA, NEW HAMPSHIRE.

IMPROVED ICE-CREAM MACHINE.

Specification forming part of Letters Patent No. 44,851, dated November 1, 1864.

*To all whom it may concern:*

Be it known that I, JOHN R. CHAMPLIN, of Laconia, in the county of Belknap and State of New Hampshire, have invented an Improved Ice-Cream Machine; and I do hereby declare that the following is a full and exact description thereof, reference being had to the accompanying drawings, making a part of this specification.

Figure 1 is a front elevation of the machine; Fig. 2, a central vertical section of the freezing apparatus.

Like letters designate corresponding parts in both figures.

A suitable frame, A, secured on a base, B, receives the driving-gear, which consists of a crank, D, and a bevel cog-wheel, $a$, on its shaft $d$, gearing into two bevel-pinions, $b$ $c$, on vertical axes F G.

To the inner axis, F, the shaft H of the cream-beater is coupled, and to the outer axis, G, is coupled the hollow sleeve L with the bail I, whereby the cream vessel or holder N receives rotary motion. Thus both the beater and the cream-holder are revolved in opposite directions, thereby doubling the relative motions thereof.

My improved manner of coupling these parts is such as to afford unusual convenience in putting in and taking out the cream, and is substantially as follows: The vessel C, which contains the ice, rests immediately on the base B, and there is a raised ledge, $e$, on the back part of the base, with a central portion of it cut away, which allows the vessel C to just enter and fit therein in the precise position required to center it under the revolving axes F G. The couplings above are such as to allow this vessel, with the cream-holder inside, to be simply shoved in and out on the base B. First, there is a socket open on one side, in the lower end of the interior axis, F, into which the square or angular end $h$ of the beater-shaft H fits and is coupled thereby to the axis, as shown in Fig. 1. Then there is a notch, $f$, of the same size, in the lower end of the outer axis, G, which allows the shaft H to be inserted into its socket. when the two notches coincide; but this is only for a moment in their revolution, exactly in front, so that the coupling can only take place just in the direction in which the vessel C itself is shoved in and out. At all other parts of the revolution the hollow axis G retains the shaft H in its socket of the axis F. There is a cross coupling-bar, $g$, on the lower end of the axis G, by which said axis is coupled to a bail, I, of the cream-holder N. This bail centers round the shaft H with its sleeve L and bears against the pins $i$ $i$, projecting downward from the cross-bar $g$, near its outer extremities, so that as the cross-bar turns with the axis G the bail I must turn also. A button, $k$, keeps the bail in contact with the pins $i$ $i$. When it is to be uncoupled and the whole apparatus withdrawn from the gearing, the button $k$ is raised and the bail turned round so as not to touch the pins $i$ $i$, when all can be taken out together, as described above. The cover M of the cream-holder N, to which the bail I and sleeve L are attached, fits down over the top of the vessel N, and has a notch in one edge fitting over a projection on the outside of the vessel, whereby the two are securely united, and are made to revolve together. The lower end, $n$, of the beater-shaft H turns in a step, $m$, in the center of the bottom of the cream-holder, and this step is also pointed below, so as to fit and turn in another step, $l$, centrally in the bottom of the ice-vessel C, all as shown in Fig. 2.

My improved beater is of peculiar construction and operation. From the shaft H opposite radial arms $p$ $p$ $p$ $p$ extend outward nearly to the sides of the vessel N. Then from the upper to the lower arms extend guide-bars $r$ $r$, which are farther from the shaft at the bottom than at the top. The portions of the arms $p$ $p$ $p$ $p$ outside of these guide-bars receive the oblong slots $s$ $s$ of a pair of wooden scrapers, P P, substantially as shown in Fig. 2. The slots $s$ $s$ allow the scrapers to be adjusted lengthwise up or down as much as desired, and screws $u$ $u$ are screwed down into the ends of the scrapers and bear on the upper arms, $p$ $p$. By turning these screws the scrapers are moved up or down, and since they taper downward and bear against the guide-bars $r$ $r$, which vary in distance from the shaft at their upper and lower ends, by this adjustment of the scrapers up and down their outer edges are moved out from or in nearer to the center, as required, so as to suit varying sizes of cream-vessels N, the object being to keep the scrapers in pretty close contact with the interior of the vessel, so that by continually removing the ice therefrom as fast as it forms and allowing unfrozen cream to take the place immediately in contact with the surface the freezing goes on the more rapidly. Springs *t t* keep the scrapers pressed down upon the arms *p p* and in place thereon, close to the guide-bars *r r*. The scrapers are somewhat concave on their front sides.

In addition to the scrapers P P of the beater there is a scraper or "scoop," S, on one side of the shaft, close to the bottom, being concave forward and having its lower edge most advanced. And about half-way up the shaft, on the opposite side, is another scoop, R, also having its lower edge most advanced in motion. These scrapers or scoops finely divide the frozen cream, and have the effect to make it lighter, or from twenty to thirty per cent. more bulky than when they are not used.

What I claim as my invention, and desire to secure by Letters Patent, is—

1. The combined arrangement of the coupling devices, whereby the whole freezing apparatus is readily coupled to the driving-gear and as readily removed therefrom, substantially as and for the purpose herein specified.

2. The construction and arrangement of the adjustable scrapers P P of the beater, substantially as and for the purposes herein set forth.

3. The combined arrangement and construction of the two scrapers or scoops, R S, being concave in front, and having their lower edges most advanced, in combination with the side scrapers, P P'', substantially as and for the purpose herein specified.

The above specification of my improved ice-cream machine signed by me this 24th day of June, 1864.

JOHN R. CHAMPLIN.

Witnesses:
G. L. DINSMORE,
BENJ. P. GALE.